United States Patent
Gao et al.

(10) Patent No.: US 9,836,430 B2
(45) Date of Patent: Dec. 5, 2017

(54) BACKBOARD FOR HARD DISK DRIVE AND ELECTRONIC DEVICE USING THE BACKBOARD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Yang Gao, Shenzhen (CN); Kang Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 295 days.

(21) Appl. No.: 14/804,905

(22) Filed: Jul. 21, 2015

(65) Prior Publication Data
US 2017/0024351 A1    Jan. 26, 2017

(51) Int. Cl.
G06F 13/40 (2006.01)
G06F 13/42 (2006.01)
H05K 7/20 (2006.01)

(52) U.S. Cl.
CPC ...... *G06F 13/4221* (2013.01); *G06F 13/4022* (2013.01); *G06F 13/4068* (2013.01)

(58) Field of Classification Search
CPC ............ G06F 13/40; G06F 13/42; G06F 1/16; H05K 7/20
See application file for complete search history.

(56) References Cited

U.S. PATENT DOCUMENTS

| | | | | |
|---|---|---|---|---|
| 6,438,625 B1* | 8/2002 | Olson | ................... | G06F 13/409 361/788 |
| 8,244,948 B2* | 8/2012 | Johnson | .............. | G06F 13/4022 710/300 |
| 8,583,847 B2* | 11/2013 | Paul | .................... | G06F 13/4072 710/303 |
| 8,737,067 B1* | 5/2014 | Kim | ..................... | H05K 7/1492 342/175 |
| 8,943,226 B1* | 1/2015 | Hoglund | ............... | G06F 3/0659 710/11 |
| 8,995,147 B2* | 3/2015 | Liu | ...................... | H01R 31/065 361/781 |

(Continued)

*Primary Examiner* — Henry Tsai
*Assistant Examiner* — Christopher A Daley
(74) *Attorney, Agent, or Firm* — Steven Reiss

(57) ABSTRACT

A backboard applied in an electronic device includes a storage extended chip, a serial attached small computer system interface (SAS) hard disk drive (HDD) connector, a convertor, a first election unit, and a second election unit. An input pin of the convertor is coupled to a plurality of input pins of the SAS HDD, to receive the data signal from the SAS HDD connector. The first election unit is coupled to a first ground pin of the SAS HDD connector, enable pins of the convertor and the storage extended chip. The second election unit is coupled to the first ground pin of the SAS HDD connector and an enable pin of the storage extended chip. When the SAS HDD connector is coupled to a SATA HDD or a SAS HDD, the storage extended chip operates and receives a SAS signal from the SAS HDD connector.

14 Claims, 3 Drawing Sheets

(56) References Cited

U.S. PATENT DOCUMENTS

| | | | |
|---|---|---|---|
| 2011/0289240 A1* | 11/2011 | Katano | G06F 13/387 710/16 |
| 2012/0151097 A1* | 6/2012 | Lambert | G06F 3/0689 710/13 |
| 2012/0166885 A1* | 6/2012 | Zhan | G11B 20/1816 714/42 |
| 2013/0050930 A1* | 2/2013 | Wu | G11B 33/126 361/679.33 |
| 2014/0156878 A1* | 6/2014 | Hameed | H04L 67/1097 710/19 |
| 2014/0325285 A1* | 10/2014 | Wu | G06F 11/0745 714/43 |

* cited by examiner

BACKBOARD FOR HARD DISK DRIVE AND ELECTRONIC DEVICE USING THE BACKBOARD

FIELD

The subject matter herein generally relates to a backboard for hard disk drive and electronic device using the backboard.

BACKGROUND

Just a bunch of disks (JBOD) is a storage device with a plurality of hard disk drives (HDD), such as serial attached small computer system interface (SAS) HDD and serial advanced technology attachment (SATA) HDD, to transmit SAS signal and SATA signal. However, when the SAS signal is transmitted by the JBOD, the redundant data can be recognized.

BRIEF DESCRIPTION OF THE DRAWINGS

Implementations of the present technology will now be described, by way of example only, with reference to the attached figures.

DETAILED DESCRIPTION

Figure 1:
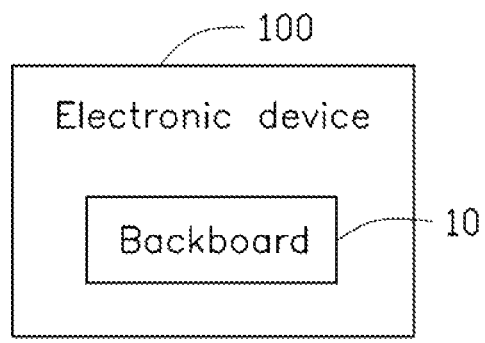
FIG. 1 is a block diagram of an example embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to an electronic device with a backboard.

FIG. 1 illustrates block diagram of an example embodiment of an electronic device 100. The electronic device 100 includes a backboard 10 for hard disk drives (HDDs). The electronic device 100 can be a notebook or a desktop computer.

Figure 2:
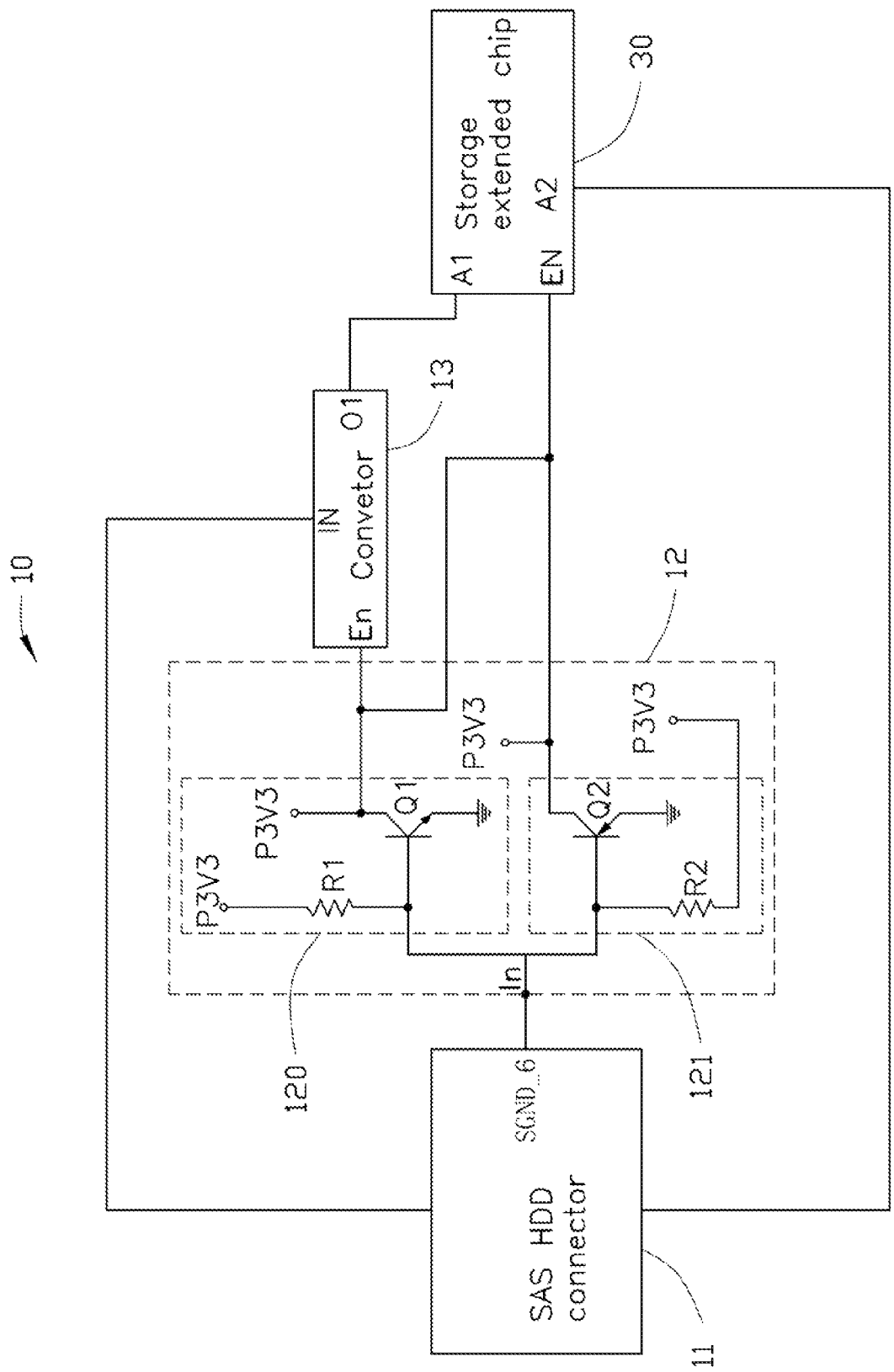
FIG. 2 is a circuit diagram of an example embodiment of a backboard of the electronic device of FIG. 1.

FIG. 2 illustrates a circuit diagram of an example embodiment of the backboard 10. The backboard 10 is configured to couple to a serial attached small computer system interface (SAS) HDD and a serial advanced technology attachment (SATA) HDD, and includes a SAS HDD connector 11, a selection unit 12, a convertor 13, and a storage extended chip 30. The selection unit 12 includes a first selection unit 120 and a second selection unit 121.

Figure 3:
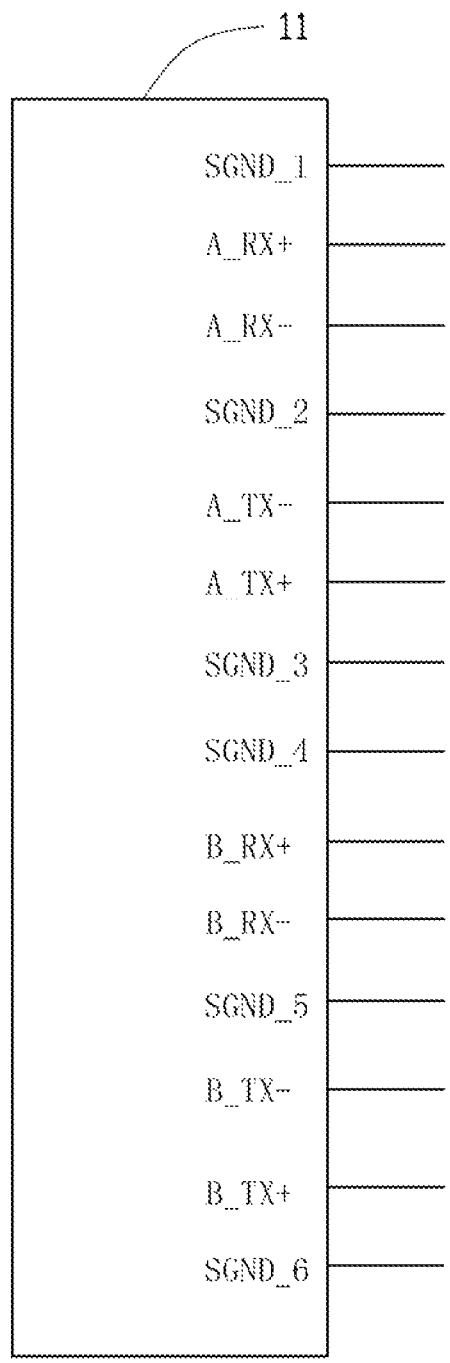
FIG. 3 is a portion schematic diagram of an embodiment of a serial attached small computer system interface on the backboard for hard disk drives of FIG. 2.

FIG. 3 illustrates a portion schematic diagram of an embodiment of the SAS HDD connector 11 includes a plurality of input pins SGND_1, A_RX+, A_RX−, SGND_2, A_TX−, A_TX+, SGND_3, SGND_4, B_RX+, B_RX−, SGND_5, B_TX−, B_TX+, and SGND_6. Each of the input pins SGND_1, SGND_2, SGND_3, SGND_4, SGND_5, and SGND_6 is a ground pin. The input pin SGND_6 of the SAS HDD connector 11 is coupled to an input terminal In of the selection unit 12, to transmit a first input signal output from the input pin SGND_6 to the input terminal In of the selection unit 12. The convertor 13 includes an enable pin En, an input terminal In, and an output pin O1. The storage extended chip 30 includes an input pin A1, A2, and an enable pin EN, and is utilized to store and extend data from SAS HDD or SATA HDD.

The first selection unit 120 includes an electronic switch Q1 and a resistor R1. A first terminal of the electronic switch Q1 is coupled to the input terminal In of the selection unit 12, and is coupled to a power source terminal P3V3 through the resistor R1. A second terminal of the electronic switch Q1 is grounded. A third terminal of the electronic switch Q1 is coupled to the power source terminal P3V3, and is coupled to the enable pin En of the convertor 13 and the enable pin EN of the storage extended chip 30. A first data signal from the input pins SGND_1, A_RX+, A_RX−, SGND_2, A_TX−, A_TX+, and SGND_3 SAS HDD connector 11 is transmitted to the input terminal In of the convertor 13. An output pin O1 of the convertor 13 is coupled to an input pin A1 of the storage extended chip 30.

The second election unit 121 includes an electronic switch Q2 and a resistor R2. A first terminal of the electronic switch Q2 is coupled to the input terminal In of the selection unit 12, and is coupled to the power source terminal P3V3 through the resistor R2. A second terminal of the electronic switch Q2 is grounded. A third terminal of the electronic switch Q2 is coupled to the power source terminal P3V3, and is coupled to the enable pin EN of the storage extended chip 30. A second data signal from the input pins SGND_1, A_RX+, A_RX−, SGND_2, A_TX−, A_TX+, SGND_3, SGND_4, B_RX+, B_RX−, SGND_5, B_TX−, B_TX+, and SGND_6 of SAS HDD connector 11 is transmitted to the an input pin A2 of the storage extended chip 30.

In the embodiment, the electronic switch Q1 is an npn bipolar junction transistor (BJT). The electronic switch Q2 is a pnp bipolar junction transistor (BJT). First to third ends of each electronic switch correspond to a base, an emitter, and a collector of the BJT, respectively. In other embodiments, the electronic switch Q1 may be replaced by an n-channel metal oxide semiconductor field-effect transistor (NMOSFET). The electronic switch Q2 may be replaced by a p-channel metal oxide semiconductor field-effect transistor (PMOSFET).

When the SAS HDD connector 11 is coupled to a SATA HDD, the input pins SGND_1, A_RX+, A_RX−, SGND_2, A_TX−, A_TX+, and SGND_3 of SAS HDD connector 11 operates, and the input pins SGND_4, B_RX+, B_RX−, SGND_5, B_TX−, B_TX+, and SGND_6 of the SAS HDD connector 11 are idle. Input pin SGND_6 of SAS HDD connector 11 outputs a digital high level, such as logic "1", signal to the input terminal In of the selection unit 12. The base of the electronic switch Q1 of the first election unit 120 receives the digital high level signal from the input pin SGND_6 of SAS HDD connector 11, and is turned on. The electronic switch Q2 of the second election unit 121 is turned off. The collector of the electronic switch Q1 outputs a digital low signal, such as logic "0", to the enable pin En of the convertor 13 and the enable pin EN of the storage extended chip 30. The convertor 13 operates, and converts the SATA signal received from the SGND_1, A_RX+, A_RX−, SGND_2, A_TX−, A_TX+, and SGND_3 of the SAS HDD connector 11 to a SAS signal. The enable pin EN of the storage extended chip 30 receives a digital low signal from the collector of the electronic switch Q1. The input pin A1 of the storage extended chip 30 receives the SAS signal from the output pin O1 of the convertor 13.

When the SAS HDD connector 11 is coupled to a SAS HDD, the input pins SGND_1, A_RX+, A_RX−, SGND_2, A_TX−, A_TX+, SGND_3, SGND_4, B_RX+, B_RX−, SGND_5, B_TX−, B_TX+, and SGND_6 of SAS HDD connector 11 operates. The input pin SGND_6 of the SAS HDD connector 11 is grounded, and outputs a digital low signal to the input terminal In of the selection unit 12. Each base of the electronic switches Q1 and Q2 receives the digital low signal from the input pin SGND_6 of the SAS HDD connector 11. The electronic switch Q1 is turned off. The electronic switch Q2 is turned on. The collector of the electronic switch Q2 outputs a digital low signal to the enable pin EN of the storage extended chip 30. A SAS signal output from the input pins SGND_1, A_RX+, A_RX−, SGND_2, A_TX−, A_TX+, SGND_3, SGND_4, B_RX+, B_RX−, SGND_5, B_TX−, B_TX+, SGND_6 of the SAS HDD connector 11 is transmitted to the input pin A2 of the storage extended chip 30.

Therefore, the SAS HDD and the SATA HDD can share a backboard 10. When the backboard 10 is coupled to the SATA HDD, the SATA signal from the SATA HDD can be converted to the SAS signal. The SAS signal can recognize the redundant data.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A backboard comprising:
   a storage extended chip comprising an enable pin, an input pin, and an output pin;
   a serial attached small computer system interface (SAS) hard disk drive (HDD) connector comprising a plurality of input pins and a plurality of ground pins, and a data output, the plurality of ground pins further comprises a first ground pin;
   a convertor comprising an input pin, an enable pin, and an output pin, wherein the input pin of the convertor is coupled to the plurality of input pins of the SAS HDD, to receive data from the data output; and
   an election unit comprising an input terminal, a first election unit, and a second election unit, wherein the first election unit is coupled to the first ground pin of the SAS HDD connector, the enable pin of the convertor, and the enable pin of the storage extended chip, the second election unit is coupled to the first ground pin of the SAS HDD connector and the enable pin of the storage extended chip;
   wherein the second election unit includes a first electronic switch and a first resistor, a first terminal of the first electronic switch is coupled to the input terminal of the election unit, and is coupled to the power source terminal through the first resistor; a second terminal of the first electronic switch is grounded; a third terminal of the first electronic switch is coupled to the power source terminal.

2. The backboard of claim 1, wherein when the SAS HDD connector is coupled to a SATA HDD, the first ground pin of the SAS HDD connector outputs a digital high level signal to the input terminal of the election unit, the first election unit operates, the second election does not operate, the first election unit outputs a first control signal to the enable pin of the convertor and the enable pin of the storage extended chip, the storage extended chip operates and receives a SAS signal from the SAS HDD connector.

3. The backboard of claim 2, wherein when the SAS HDD connector is coupled to a SAS HDD, the first ground pin of the SAS HDD connector is grounded, and outputs a digital low level signal to the input terminal of the election unit, the first election unit does not operate, the second election unit operates, the second election unit outputs a second control signal to the enable pin of the storage extended chip, the storage extended chip operates and receives a SAS signal from the SAS HDD connector.

4. The backboard of claim 3, wherein the first election unit comprises a second electronic switch and a second resistor, a first terminal of the second electronic switch is coupled to a first input pin of the SAS HDD connector, and is coupled to the first power source terminal through the second resistor; a second terminal of the second electronic switch is grounded; a third terminal of the second electronic switch is coupled to the power source terminal, and is coupled to the enable pins of the convertor and the storage extended chip.

5. The backboard of claim 4, wherein the first electronic switch is an npn bipolar junction transistor (BJT), the first to third terminals of the npn BJT correspond to a base, an emitter, and a collector of the BJT, respectively.

6. The backboard of claim 5, wherein the second electronic switch is a pnp bipolar junction transistor (BJT), the first to third terminals of the pnp BJT correspond to a base, an emitter, and a collector of the BJT, respectively.

7. The backboard of claim 1, wherein the third terminal of the first electronic switch is coupled to the enable pin of the storage extended chip.

8. An electronic device comprising a backboard, the backboard comprising:
   a storage extended chip comprising an enable pin, an input pin, and an output pin;
   a serial attached small computer system interface (SAS) hard disk drive (HDD) connector comprising a plurality of input pins and a plurality of ground pins, and a data output, the plurality of ground pins further comprising a first ground pin;
   a convertor comprising an input pin, an enable pin, and an output pin, wherein the input pin of the convertor is coupled to the plurality of input pins of the SAS HDD, to receive data from the data output; and
   an election unit comprising an input terminal, a first election unit, and a second election unit, wherein the first election unit is coupled to the first ground pin of the SAS HDD connector, the enable pin of the convertor, and the enable pin of the storage extended chip, the second election unit is coupled to the first ground pin of the SAS HDD connector and the enable pin of the storage extended chip;

wherein the second election unit includes a first electronic switch and a first resistor, a first terminal of the first electronic switch is coupled to the input terminal of the election unit, and is coupled to the power source terminal through the first resistor; a second terminal of the first electronic switch is grounded; a third terminal of the first electronic switch is coupled to the power source terminal.

9. The electronic device of claim 8, wherein when the SAS HDD connector is coupled to a SATA HDD, the first ground pin of the SAS HDD connector outputs a digital high level signal to the input terminal of the election unit, the first election unit operates, the second election does not operate, the first election unit outputs a first control signal to the enable pin of the convertor and the enable pin of the storage extended chip, the storage extended chip operates and receives a SAS signal from the SAS HDD connector.

10. The electronic device of claim 9, wherein when the SAS HDD connector is coupled to a SAS HDD, the first ground pin of the SAS HDD connector is grounded, and outputs a digital low level signal to the input terminal of the election unit, the first election unit does not operate, the second election unit operates, the second election unit outputs a second control signal to the enable pin of the storage extended chip, the storage extended chip operates and receives a SAS signal from the SAS HDD connector.

11. The electronic device of claim 10, wherein the first election unit comprises a second electronic switch and a second resistor, a first terminal of the second electronic switch is coupled to a first input pin of the SAS HDD connector, and is coupled to the first power source terminal through the second resistor; a second terminal of the second electronic switch is grounded; a third terminal of the second electronic switch is coupled to the power source terminal, and is coupled to the enable pins of the convertor and the storage extended chip.

12. The electronic device of claim 11, wherein the first electronic switch is an npn bipolar junction transistor (BJT), the first to third terminals of the npn BJT correspond to a base, an emitter, and a collector of the BJT, respectively.

13. The electronic device of claim 12, wherein the second electronic switch is a pnp bipolar junction transistor (BJT), the first to third terminals of the pnp BJT correspond to a base, an emitter, and a collector of the BJT, respectively.

14. The electronic device of claim 8, wherein the third terminal of the first electronic switch is coupled to the enable pin of the storage extended chip.

* * * * *